Sept. 29, 1959     H. O. WHIPPLE     2,905,990

APPARATUS FOR DIE CASTING

Filed April 19, 1956     5 Sheets-Sheet 1

INVENTOR
HARRY O. WHIPPLE

BY Strauch, Nolan & Neale

ATTORNEYS

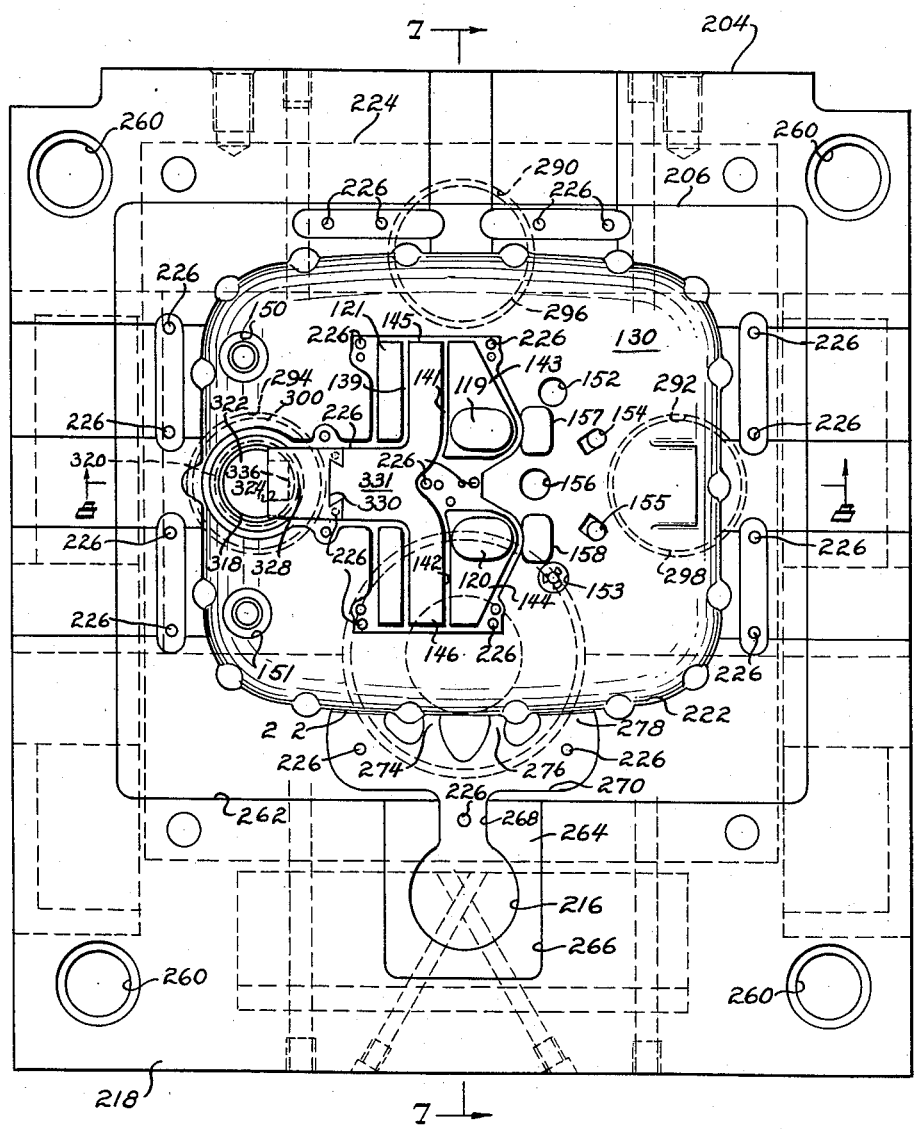

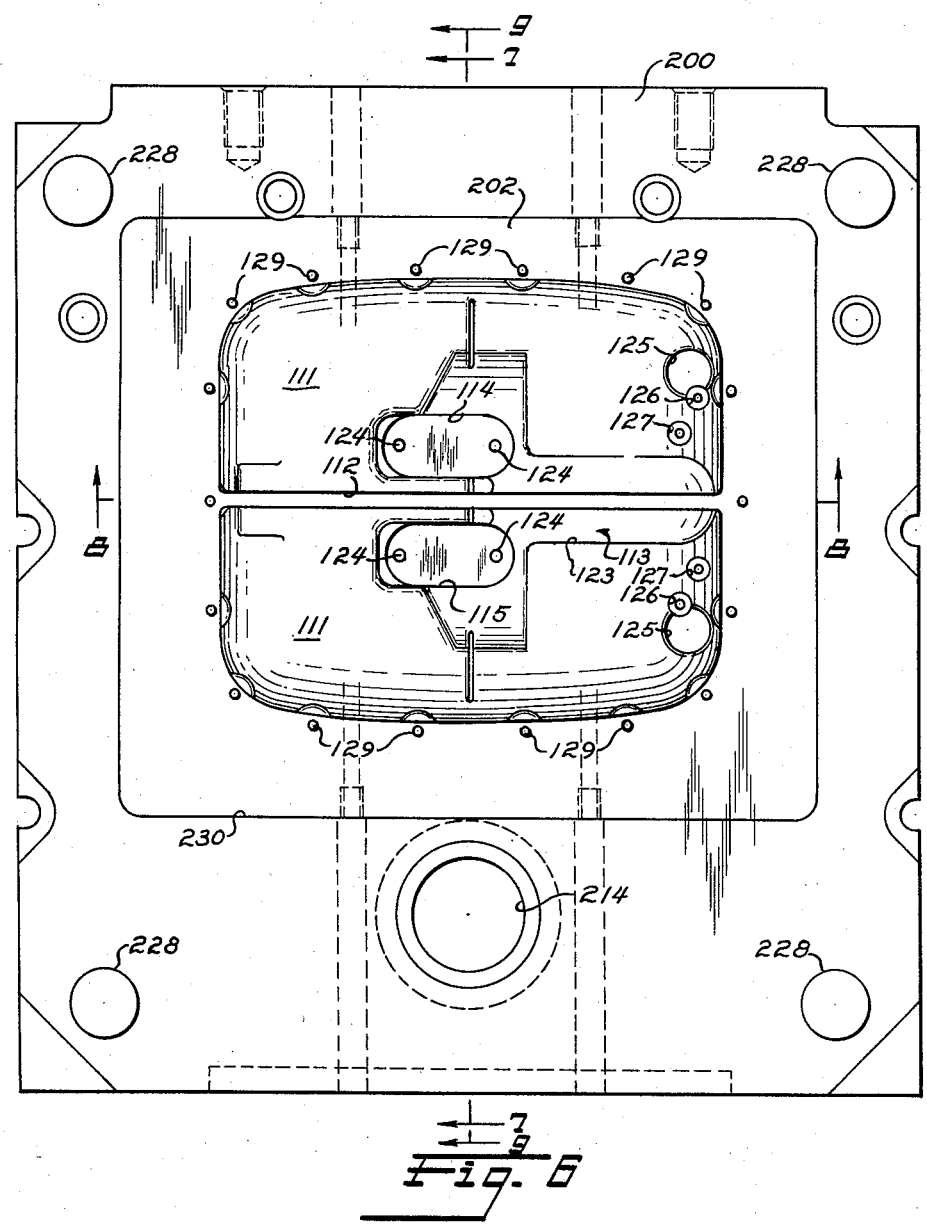

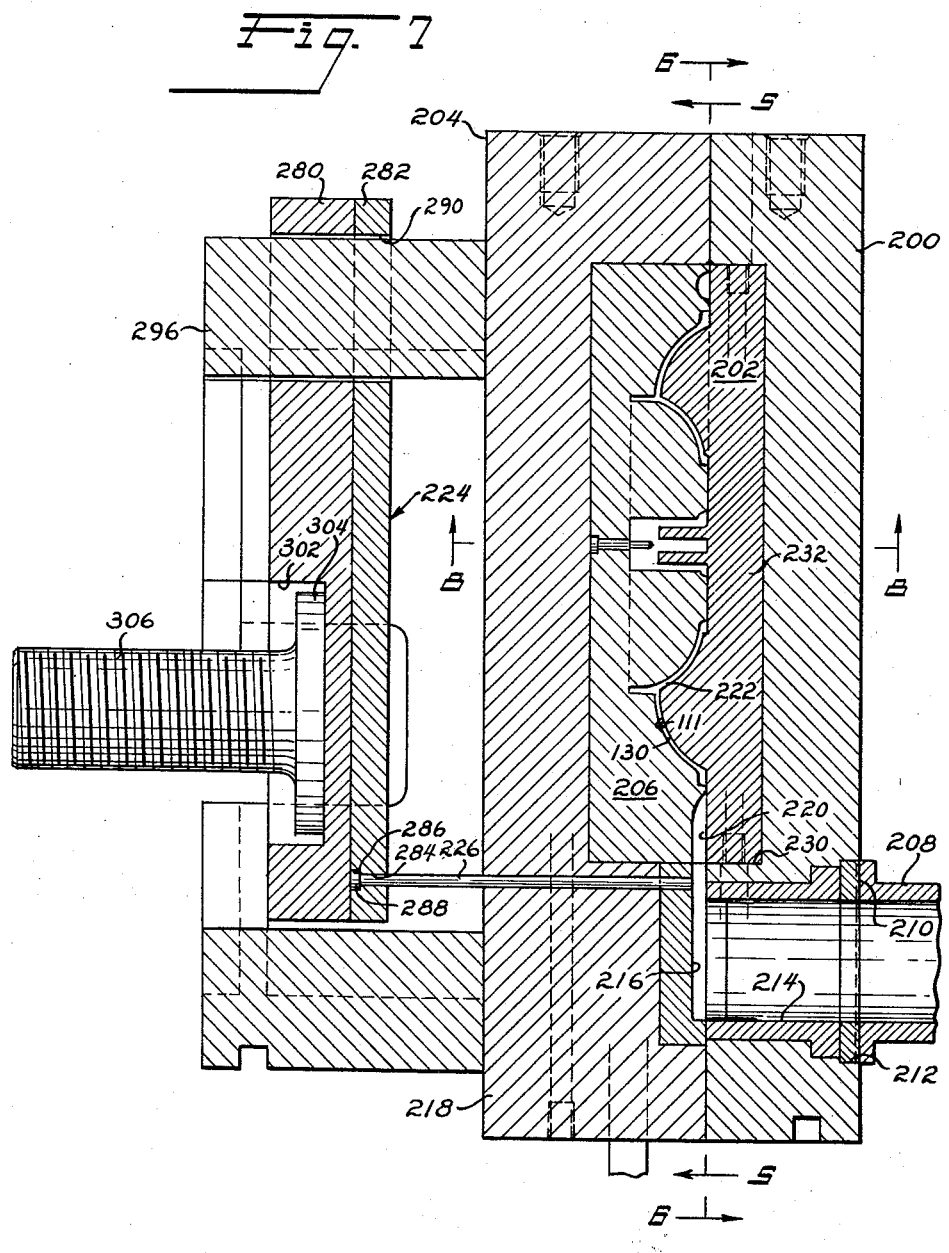

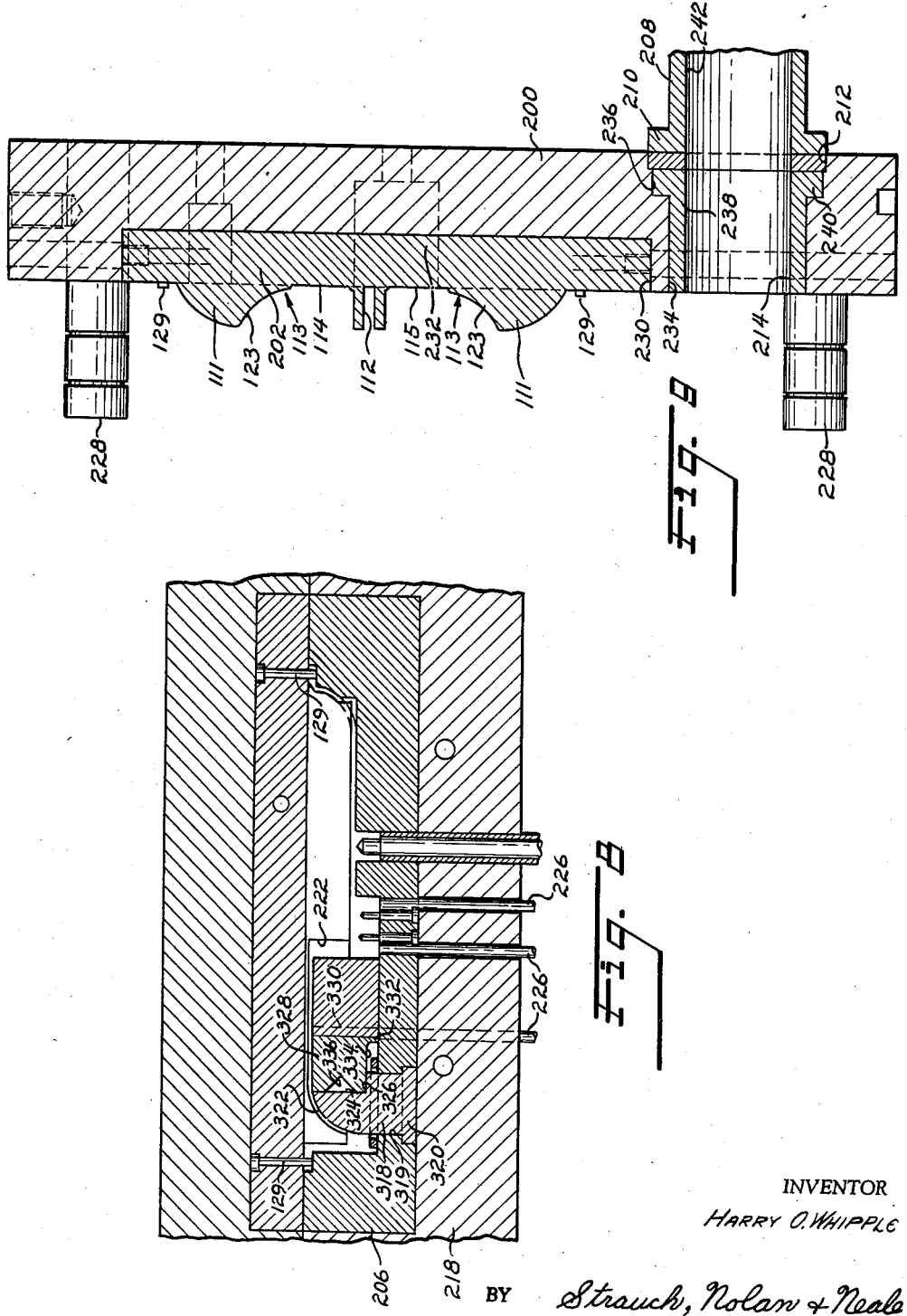

United States Patent Office 2,905,990
Patented Sept. 29, 1959

2,905,990

APPARATUS FOR DIE CASTING

Harry O. Whipple, Russellville, Ky., assignor to Rockwell Manufacturing Company, Pittsburgh, Pa., a corporation of Pennsylvania Application April 19, 1956, Serial No. 579,370

9 Claims. (Cl. 22—93)

The present invention relates to improvements in die structures for use in injection molding and more particularly relates to the provision of die structures for use in injection molding of articles having externally opening internal passages. While the present invention is generally applicable to the art of die casting, it is of particular importance in the injection molding of valve plates for gas meters.

In certain types of gas meters, a valve plate is provided which forms a cover for the measuring chambers and which is provided with a top inlet port opening into a passage located internally of the valve plate and extending to a port on top of the valve plate which is controlled by a slide valve to effect proper distribution to the measuring chambers of the meter of the gas received through the inlet port. Prior to the present invention valve plates of this type, an example of which is disclosed in application Serial No. 376,853, filed August 27, 1953 by Howard J. Evans for Gas Meters, now Patent 2,818,046 issued Dec. 31, 1957, have been formed by injection molding the valve plate in the form that it has with the top wall of the internal passage removed, by injection molding a separate element in the form of the top wall of the internal passage, and by joining these two separately formed members in fluid tight relation to form the internal passage through the valve plate. As is apparent, valve plates formed in this manner are quite expensive to manufacture.

It is the primary object of the present invention to provide improved die structure and injection molding methods whereby a gas meter valve plate can be fabricated in a single injection molding operation.

The principal subsidiary objects of the present invention are to provide:

(1) Improved injection molding die structure and methods such that articles having an internal passage opening externally of the article through one of the opposite faces thereof may be formed in a single injection molding operation.

(2) Improved injection molding die structure and methods such that an article having an internal passage interconnecting spaced openings through an external wall of such article may be formed in a single injection molding operation.

These and other objects of the present invention will become more fully apparent by reference to the appended claims and as the following detailed description proceeds in reference to the accompanying drawings wherein:

Figure 5 is an elevation view of the face of the ejector die of the present invention with the segmental core structure in place, being substantially a section along the line 5—5 of Figure 7;

Figure 6 is an elevation view of the face of the cover die;

Figure 7 is a sectional view through the ejector and cover dies and associated mechanism with the dies in closed position taken substantially along the line 7—7 of Figures 5 and 6;

Figure 8 is a fragmentary sectional view taken substantially along the line 8—8 of Figures 5, 6 and 7; and Figure 9 is a sectional view of the cover die taken substantially along the line 9—9 of Figure 6 showing the cover die with the ejector die and related mechanism removed.

Figure 1:
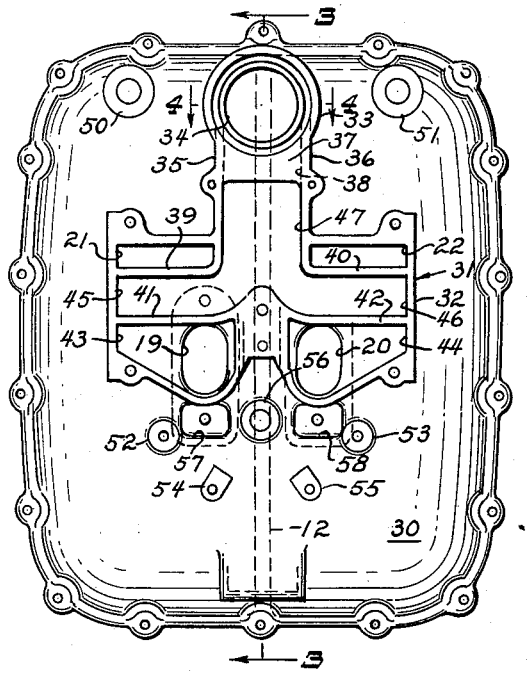
Figure 1 is a top plan view of a valve plate injection molded by the die structure of the present invention.
Figure 3:
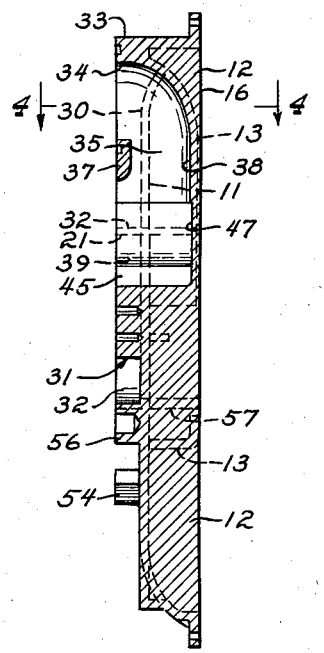
Figure 3 is a sectional view taken substantially along the line 3—3 of Figure 1.
Figure 2:
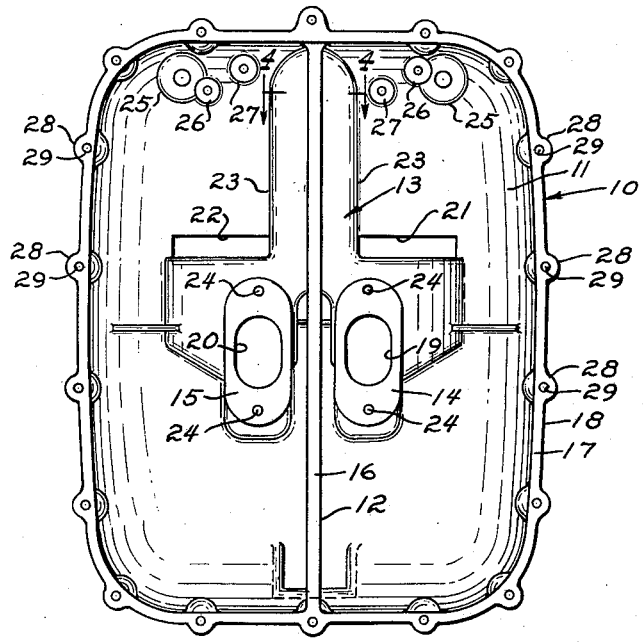
Figure 2 is a bottom plan view of the valve plate of Figure 1.
Figure 4:
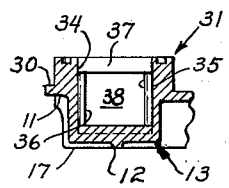
Figure 4 is a fragmentary sectional view taken substantially along the line 4—4 of Figures 1 and 2.

Referring now to the drawings in detail, a valve plate injection molded in accordance with the method and utilizing the die structure of the present invention is shown in detail in Figures 1 through 4. Valve plates of the type to which the present invention relates form, in assembly in a gas meter, a wall between a gas inlet chamber above the valve plate and a plurality of measuring chambers below the plate. The measuring chambers are defined by a transversely partitioned open topped casting upon which the valve plate is mounted and a bellows in each half of the casting, thus defining a total of four measuring chambers, one internally of each bellows, and one in each half of the casting externally of the bellows therein.

The valve plate 10 has a concave bottom face 11 which is divided by a longitudinally extending rib 12 and from which projects an irregularly shaped boss formation 13. The downward projection of boss formation 13 terminates in bottom planar faces 14 and 15 coplanar with the bottom surface 16 of the rib 12 and the bottom surface 17 of a peripheral flange 18. Surfaces 14 and 15 are the mounting surfaces for the bellows referred to above and are formed with apertures or ports 19 and 20 through which gas is admitted into and exhausted from the bellows. Apertures 21 and 22 are formed through the valve plate 10 adjacent the side wall 23 of the boss formation 13. These apertures 21 and 22 are the ports through which gas is admitted into and exhausted from chambers of the meter bottom casting exteriorally of the bellows therein. Faces 14 and 15 are formed with bores 24 spaced on each side of the apertures 19 and 20. Prior to final assembly, bores 24 are tapped to form mounting holes to permit fluid tight attachment of the bellows to the valve plate 10. Additional bosses 25, 26 and 27 project from the bottom concave face 11 of the valve plate 10 at each side of the rib 12 to provide mounts for various meter components. The peripheral flange 18 is formed with outwardly projecting lugs 28 each having a through aperture 29 to permit mounting of the valve plate 10 to the top of the outside wall of the meter casing bottom casting.

The top surface 30 of the valve plate 10 is convex and is formed with an upwardly projecting boss formation 31 located in alignment with the boss formation 13 on the concave bottom face 11. Boss formation 31 consists basically of a peripheral wall 32 defining a cylindrical boss 33 having an opening 34 forming an exhaust port, parallel side walls 35 and 36 interconnected by a top wall 37 forming an internal exhaust channel 38 leading to the opening 34, and a large cellular portion divided by ribs 39, 40, 41 and 42. Ribs 39 and 40 extend downwardly to the top surface of the underside boss formation 13, at their lower ends forming portions of sidewall 23 of boss formation 13, and with the peripheral wall 32 define the ports 39 and 40 respectively which communicate with the bottom casting chambers externally of the bellows. Ribs 41 and 42 extend downwardly to the top surface of the underside boss formation 13 and with the peripheral wall 32 define depressions 43 and 44 terminating in ports 19 and 20 respectively.

Ribs 41 and 42 coact with ribs 39 and 40 and the top surface of the underside of boss formation 13 to define lateral branches 45 and 46 of the longitudinal open top extension 47 of the enclosed exhaust channel 38.

The top surfaces of peripheral wall 32 and ribs 39, 40, 41 and 42 are all coplanar and form a mounting surface for a slide valve. The slide valve in the meter assembly is cyclically operative to connect exhaust channel branches 45 and 46 in fluid communication with ports 19 and 20 and with ports 21 and 22 alternately.

The top convex surface 30 of the valve plate 10 is formed with a plurality of bosses 50 to 56 and a pair of depressions 57 and 58 which provide mounts for meter components or otherwise enter into the meter operation but are unrelated to the present invention.

The present invention relates to the provision of injection molding die structure and methods by which the valve plate of Figures 1 to 4 or similar articles can be formed in a single injection molding operation.

Prior to the present invention, it was necessary to form the top wall 37 of the internal exhaust channel or passage 38 as a separate injection molded member and to secure the top wall 37 to the top of the side walls 35 and 36 in fluid tight relation as by the use of a gasket and mounting screws.

This was necessary because in prior art injection molding it has been necessary to so form the cores which form the various recesses and passage through an injection molded article that the cores are removed from the cast article prior to or during ejection of the article from the ejector die.

The art of providing certain forms of exteriorly opening internal passages has been known for many years in the casting of articles other than by injection molding as is shown for example by United States Patent No. 993,523 issued May 30, 1911 to C. A. Heinzelman for Mold for Forming Roller Bearing Cages, United States Patent No. 966,306 issued August 2, 1910 to F. E. Brown for Mold for Brass Castings, and United States Patent No. 848,480 issued March 26, 1907 to W. S. Myers for Mold for Sash Weights, etc. These techniques are, however, inherently inapplicable to injection molding.

By the use of relatively complicated machines, the injection molding art has developed the technique of forming side opening recesses in small injection molded articles as is shown by United States Letters Patent No. 2,487,359 issued November 8, 1949 to P. Natzler for Apparatus for Molding Slide Fastener Sliders, United States Patent 2,615,225 issued October 28, 1952 to P. F. Epple for Slider for Slide Fasteners, United States Patent No. 2,672,662 issued March 23, 1954 to L. H. Morin for Apparatus for Producing Die Cast Sliders, and United States Patent No. 2,705,345 issued April 25, 1955 to P. F. Epple for Manufacture of Sliders for Slide Fasteners. These techniques likewise form no solution to the problem of injection molding of articles, such as a valve plate, having an externally opening internal passage.

If further information as to the structure and purpose of the various parts of the valve plate 10 is found to be necessary to a complete understanding of the present invention, reference is made to the aforesaid copending application Serial No. 376,853.

Referring now to Figures 5 to 9, and particularly to Figure 7, the molding apparatus of the present invention is seen to be an injection molding apparatus for so called "cold chamber" molding and to comprise an adaptor plate 200 rigidly mounting a cover die 202 and a cooperating ejector die asesmbly 204 having an ejector die 206 rigidly mounted thereon. The die structure of the present invention is adapted for use in a die casting machine of a type similar to that disclosed in United States Patent No. 2,612,666 issued October 7, 1952 to J. J. McGarigal for Die Casting Apparatus.

The adapter 200 and the ejector die assembly 204 are mounted upon suitable guides for translatory movement in a horizontal path relative to the end wall of the molding machine. The machine end wall supports a shot sleeve 208 from which the machine is operative in timed relation to the adaptor movement to discharge a predetermined volume or charge of molten metal.

In a molding operation, the entire assembly of the adaptor 200, cover die 202 and ejector die assembly 204 are moved horizontally to the right as viewed in Figure 7 until the end flange 210 of the fixed shot tube 208 is received in the aligned recess 212 in the end wall of the adaptor 200. When the assembly of Figure 7 is in that position, a predetermined molten charge is ejected under pressure through the shot tube 208 into the coaxially aligned opening 214 through the adaptor 200, into the recess 216 of the main body plate 218 of the ejector die assembly 204 and upwardly through the passage 220, defined by a recess in the ejector die 206 and the mating face of the cover die 202 into the die cavity 222. After a sufficient time has elapsed for the metal within the die cavity 222 to harden, the adaptor 200 and the ejector die assembly 204 are moved together to the left as viewed in Figure 7. After a predetermined magnitude of such conjoint movement, movement of adaptor 200, together with the cover die 202, is arrested while the ejector die assembly and the ejector die 206 continue to move. The cast article is at this time carried by the ejector die 206. After sufficient movement of the ejector die 206 for the cast article to clear the projecting portions of the profile of the cover die 202, movement of the portion of the ejector assembly 224 mounting the projecting ejector pins 226 is arrested. Continued movement to the left of the ejector die assembly 206 while the ejector assembly 224 is retained stationary, through the action of ejector pins 226, forces the cast article from the ejector die 206 and permits the cast article to drop between the adjacent faces of the cover die 202 and the ejector die 206 to the bottom of the machine.

Referring now to Figures 6 and 9, which is a view taken substantially along the line 6—6 of Figure 7 showing the adaptor 200 and the cover die 202 with the ejector die assembly 204 removed. The adaptor plate 200 has fixed thereto at each corner a guide pin 228 and is provided with a recess 230 in which the main plate portion 232 of the cover die 202 is received. Beneath the recess 230, adapter plate 200 is formed with a through bore 234 having a stepped counter bore 236. A hardened steel insert 238 provided with an end flange 240 is fixed within the bore 234, the flange 240 being received within the counterbore 234. The recess 212 is slightly larger than the counterbore 236 and receives the flange 210 of shot tube 208 when the cover die and the adapter plate 200 is moved to its extreme right position. The flange 210 is received within the recess 212 in a piloting fit to accurately align the shot tube 208 relative to the insert 238 so that the aperture 214 defined by the bore of the insert 238 forms a continuous extension of the bore 242 of the shot tube 208, being equal in diameter thereto and coaxially aligned therewith.

The face of the cover die 202 is provided with suitably located bosses and recesses and is of suitable contour to form the concave undersurface of the valve plate 10 shown in Figures 1 through 4, the parts of the die 202 corresponding to the previously designated portions of the valve plate 10 have been assigned reference numerals one hundred higher than the corresponding part on the valve plate for convenient cross reference between the drawings. The main portion of the cover die 202 is formed by suitable curved raised portions 111 to form the concave bottom surface 11 of the valve plate 10. A plurality of cylindrical studs 129 are disposed about the periphery of the portions 111 to provide for the screw apertures 29 in the peripheral flange of the final casting. Recesses 125, 126 and 127 are provided to form the bosses 25, 26 and 27; a recess 112 separates the two portions 111 to define the central rib 12 and a depression 113 defined by side wall 123 and terminating in planar bottom surface oval recesses 114 and 115 forms of the bottom boss formation 13.

Referring now to Figure 5, the main plate 218 of the ejector die assembly 204 is provided with a through aperture 260 in each corner thereof to receive the corresponding corner pins 228 of the cover die adaptor plate 200 and establish perfect alignment therebetween when the adaptor 200 and the ejector die assembly 204 are together as shown in Figure 7. As is apparent from reference to Figures 5 and 7, the plate 204 is formed with a generally square recess 262 in which the ejector die 206 is fixed. A hardened steel insert 264 is provided within a recess 266 to form the channel 216 through which molten metal is directed through a neck 268 of reduced cross section into a diverging channel 270 to be distributed into the die cavity 222 through distinct channels 272, 274, 276 and 278.

The ejector assembly 224 (Figure 7) is formed by a pair of plates 280 and 282 which are fixed together. Plate 282 is formed with through apertures 284 having counterbores 286 on their face adjacent the plate 280 to receive the heads 288 of the ejector pins 226 and rigidly mount pins 226 therebetween. Plates 280 and 282 are formed with three through bores 290, 292 and 294 (Figure 5) through which extend cylindrical pins 296, 298 and 300 respectively. Pins 296, 298 and 300 are fixed to the plate 218 and extend freely through the bores 290, 292 and 294 permit free relative movement of the ejector assembly 224 relative to the plate 218. Plate 280 is provided with a recess 302 in which is received the end flange 304 of an ejector plunger 306 which is utilized to transmit axial force to the ejector assembly 224 to restrain further movement thereof as the plate 218 and ejector die 206 continues its leftward movement to effect ejection of the cast article 10, as has been previously described. As is apparent from reference to Figure 5, the ejector pins 226 are distributed throughout the die cavity 222 and about that cavity to force the cast article from the die cavity without distorsion or breakage.

The recesses and bosses corresponding to the bosses and recesses of the top face of the valve plate 10 shown in Figures 1 through 4 have been assigned reference numerals one hundred higher than the corresponding parts on the casting. With this cross referencing, and the foregoing description, a detailed description of the several recesses and bosses forming the face of the die cavity 222 is believed to be unnecessary.

The injection molding method of the present invention is characterized by the use of complementary cover and ejector dies and the provision on the ejector die of a segmental core structure including a first member having the general configuration of the whole or a major portion of an opening through the ejector die side of the article to be cast and a second member mounted on the first member for separating movement therefrom in the direction of ejection of a cast article from the ejector die, such second member having a configuration of an internal passage in the cast article communicating with the opening defined by the first member and the second member being of such size and shape that it can be removed through such opening. The method further comprises the steps of filling the cavity of such a die structure with molten metal under pressure, allowing the molten metal to solidify, ejecting the cast article and the second core member from the ejector die simultaneously, and subsequently removing the second core member from the cast article through the opening thereof communicating with the internal passage. In high production injection molding operation of such an article, a plurality of identical core members may be used in sequence in casting successive articles so that the casting of a second article need not await removal of the second core member from the first cast articles.

The segmental core structure by which the foregoing method is practiced in the fabrication of valve plates illustrated in Figures 1 to 4 is illustrated in its assembled position in the ejector die in Figures 5 and 8. This segmental die structure comprises a first member 318 having the general configuration of exhaust port 34. Core member 318 has a cylindrical body projecting through a through bore 319 in the ejector die 206 and a larger cylindrically flanged portion 320 received in counterbore 321 in the rear face of ejector die 206 and rigidly held in position between the abutting faces of the die 206 and plate 218. The cylindrical portion of member 318 projecting above the surface of ejector die 206 from bore 319 defines the port 34 of the boss 33 and terminates in a segmental spherical end surface 322 defining a portion of the curved wall joining passage 38 with port 34. A transverse notch defined by mutually perpendicular planar surfaces 324 and 326 normal to the projection plane of Figure 8 forms a seat to receive the end portion of the removable core member 328. Core member 328 is mounted by a dovetail slide connection 330 (see also Figure 5) upon a third and generally T-shaped core member 331 which is of such configuration as to define the exhaust channel extension 47 and branches 45 and 46 in the valve plate 10. T-shaped core member 331 is fixed to the face of die 206. The faces of the mating dovetail and dovetail grooves of the dovetail slide connection 330 extend parallel to the direction of movement of ejector pins 226 relative to die 206 to permit removal of core member 328 during article ejection. Core member 328 has a portion 332 adjacent the face thereof on which the dovetail groove is formed which extends down into abutment with the face of die 206 and forms the end portion of the open top channel extension 47 of the cast article.

Referring to Figure 5, it will be noted that a pair of ejector pins 226 are aligned with the end face of the portion 332 of the removable core member 328 at the opposite sides of the dovetail groove therein so that upon ejection of the cast articles 10 from the cavity 222 of the ejector die 206 core member 328 is ejected by this pair of pins with the article. The direct action of pins 226 upon the removable core member at opposite sides of the dovetail connection assures smooth removal of the core member 328 without strain on the cast article 10. The face 334 of core member 328 coacts with the adjacent face of the die 206 and the adjacent end of the core member 318 to define the top wall 37 of the internal passage 38. Core member 328 is of such size and shape that after it is removed from the die 206 with the cast article it can be removed from the cast article through the open top of exhaust channel extension 47 and branches 45 and 46. A recess 336 is formed in the end face of core member 328 abutting the surface 324 of the core member 318 to permit insertion of a punch so that the core member 328 may be knocked from the internal channel 38 of the cast article after the casting has been ejected from the injector die 206 without damage to either the cast article or the core member 328.

The dovetail slide connection 330 is a firmly fitting connection so that there is little tendency for the core member 328 to move toward the cover die 202 from its proper position as shown in Figure 8. Due to the configuration of the article in which the concavo-convex wall defined between surfaces 11 and 30 intersects the relatively perpendicular wall 35 at approximately the midpoint of the height of that wall, corresponding to the intersection of the die faces 111 and 130 at the median of the height of the core member 328, the flow of molten metal over the face of core member 328 which it first contacts is in opposite directions simultaneously initially so that there is no tendency for the molten metal to displace the core member from its proper position as shown.

The invention may be embodied in other specific forms without departing from the spirit or esssential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination with a molding die structure for use in casting articles having an internal passage provided with external openings at its opposite end through a common face of said article, said die structure comprising complementary metallic ejector and cover dies defining a cavity in the form of the article to be cast and separable by relative movement therebetween along a predetermined path to permit ejection of the cast article, a segmental metallic core structure including first and second core members fixed to said ejector die and having the general configuration of the external openings of said internal passage at the opposite ends thereof, and a third core member mounted on and extending between said first and second core members in spaced relation to said dies over at least a portion of its length and having throughout said portion of its length the general configuration of said internal passage, said third core member being separably attached to one of the first two said core members for separation therefrom during ejection of the cast article and of such size and configuration that it is removable from the cast article through the opening defined therein by one of the first two of said core members.

2. The combination defined in claim 1 wherein a dovetail slide connection is provided between said third core member and the core member to which it is attached.

3. A molding die structure for use in casting a valve plate for a gas meter which has an internal passage interconnecting the gas exhaust port thereof with the slide valve controlled port thereof, said die structure comprising a generally concave ejector die having the configuration of the convex external face of the valve plate, a cover die having a convex face in the form of the concave interior face of the valve plate, said dies when assembled together being complementary in form to define a cavity in the form of the valve plate and being separable by relative movement therebetween along a predetermined path to permit ejection of a cast valve plate from said ejector die, and a segmental metallic core structure including a first core member fixed to said ejector die and having the general configuration of said exhaust port, a second core member fixed to said ejector die and having the general configuration of said slide valve controlled port, and a third core member having the general configuration of the passage between said ports mounted on and extending between said first and second core members in spaced relation to said dies over at least a portion of its length and being attached to one of the first two said core members for separation therefrom with the cast article during ejection thereof from the ejector die and being of such size and configuration that it is removable from the cast article through one of said ports.

4. The die structure defined in claim 3 wherein the separable attachment of said third core member on said one of the first two core members is a dovetail slide connection.

5. The combination defined in claim 3 wherein said third core member is separably attached to said second core member and wherein the separable attachment between said second and third core members is a dovetail slide connection.

6. In combination with a molding die structure for use in casting articles having an externally opening internal through passage, said die structure comprising complementary metallic ejector and cover dies defining a cavity in the form of the article to be cast and separable by relative movement therebetween along a predetermined path to permit ejection of the cast article, a segmental metallic core structure including first and second core members fixed to said ejector die at spaced locations and having the general configuration of the external opening of said internal passage and a third core member having the general configuration of said internal passage separably mounted on one of first two core members for separation therefrom during ejection of the cast article from said ejector die and extending between said first two core members with at least a portion thereof in spaced relation to both of said dies.

7. In combination with a molding die structure for use in casting articles having an internal passage provided with external opening at its opposite ends, said die structure comprising complementary metallic ejector and cover dies defining a cavity in the form of the article to be cast and separable by relative movement therebetween along a predetermined path to permit ejection of the cast article, a segmental metallic core structure including a first core member fixed to one of said dies and having the general configuration of the external opening at one end of said internal passage, a second core member fixed to said ejector die and having the general configuration of the external opening of said internal passage at the other end thereof, and a third core member having the general configuration of the internal passage interconnecting said openings, said third core member being separably mounted on said second core member for separation therefrom upon ejection of the cast article and bridging the space between said first and second core members in spaced relation to both of said dies over at least a portion of its length.

8. A molding die structure for use in casting articles having an externally open internal through passage, said die structure comprising complementary metallic ejector and cover dies defining a cavity in the form of the article to be cast and separable by relative movement therebetween along a predetermined path to permit ejection of the cast article, said ejector die having a plurality of spaced ejector pins adapted to engage a cast article on said ejector die and eject said article therefrom, and a segmental metallic core including first and second core members fixed to said ejector die at spaced locations and each having the general configuration of at least the major portion of an external opening of said internal passage and an interconnecting core structure having the general configuration of said internal passage and the remaining portion of at least one of said external openings and comprising at least a third core member, said interconnecting core structure extending between and separably mounted upon said first and second core members for ejection with the cast article and having a portion abutting the face of said ejector die and a further portion in spaced relation to each of said dies, at least one of said ejector pins being so located on said ejector die as to engage the portion of said interconnecting core structure contacting said ejector die to eject said interconnecting core structure from said ejector die and disengage said interconnecting core structure from said first and second core members during article ejection movement of said die.

9. In combination, a pair of cooperating die parts defining a cavity and a segmental core mounted exclusively on but one of said parts projecting into said cavity and forming a bridge between spaced locations on said one die part and in spaced relation to the other die part, said core being so segmented as to be removed from a solidified body of material cast in said cavity about said core, said segmental core having first and second portions fixed to said one part at spaced locations and an interconnecting portion mounted on and extending between said first and second portions and in spaced relation to said die parts over at least a portion of its length.

References Cited in the file of this patent

UNITED STATES PATENTS

| | | |
|---|---|---|
| 128,264 | Thompson | June 25, 1872 |
| 389,019 | Smeaton | Sept. 4, 1888 |
| 1,347,575 | Bungay | July 27, 1920 |
| 1,599,624 | Stern | Sept. 14, 1926 |
| 1,769,455 | Pickering | July 1, 1930 |
| 1,931,587 | McConnel | Oct. 24, 1933 |
| 2,146,319 | Wagner | Feb. 7, 1939 |
| 2,302,367 | Ericson | Nov. 17, 1942 |
| 2,477,368 | Gits | July 26, 1949 |
| 2,483,093 | Harvey | Sept. 27, 1949 |

OTHER REFERENCES

Die Casting for Engineers, by the New Jersey Zinc Co.; copyright 1942, page 48, and 124–127.

Die Casting, by H. H. Doehler, First Edition, 1951 McGraw-Hill Book Company; pages 170 and 171.

Die Casting, by Charles O. Herb, Second Edition, 1952, The Industrial Press, pages 93–96.

Doehler: "Die Casting," page 172, First Edition.